United States Patent [19]

Potoczky

[11] Patent Number: 4,687,531

[45] Date of Patent: Aug. 18, 1987

[54] METHOD FOR CENTRIFUGAL SPRAY MOLDING OF THIN-WALLED STRUCTURES

[76] Inventor: Joseph B. Potoczky, 8975 Burke Ave., South Gate, Calif. 90280

[21] Appl. No.: 342,831

[22] Filed: Jan. 26, 1982

[51] Int. Cl.$^4$ ............................................. B29C 41/08
[52] U.S. Cl. ................................ 156/245; 156/304.2; 264/237; 264/308; 264/309; 425/435
[58] Field of Search ................. 264/308, 309, 237; 156/245, 304.2

[56] References Cited

U.S. PATENT DOCUMENTS

| | | | |
|---|---|---|---|
| 2,285,370 | 6/1942 | Staelin | 264/309 |
| 3,009,209 | 11/1961 | Weinbrenner et al. | 264/310 |
| 3,150,219 | 9/1964 | Schmidt | 264/258 |
| 3,187,381 | 6/1965 | Britten | 264/309 |
| 3,301,925 | 1/1967 | Engel | 264/309 |
| 3,744,951 | 7/1973 | Szatkowski | 425/435 |

FOREIGN PATENT DOCUMENTS

869082  1/1942  France ............................... 264/309

Primary Examiner—James Derrington
Attorney, Agent, or Firm—Beehler, Pavitt, Siegemund, Jagger, Martella & Dawes

[57] ABSTRACT

Thin-walled structures of substantially uniform wall thickness are made by rotating a heated mold surface about a horizontal axis and depositing powdered thermoplastic material onto the mold surface at a rate such that the deposited powder melts on contact with the mold surface and adheres thereto. A high degree of uniformity of the wall thickness is ensured by depositing the powder onto a relatively small portion of the overall mold surface and reciprocating the powder deposition means in the direction of the axis of rotation of the mold surface to thereby uniformly cover the entire mold surface.

4 Claims, 10 Drawing Figures

METHOD FOR CENTRIFUGAL SPRAY MOLDING OF THIN-WALLED STRUCTURES

BACKGROUND OF THE INVENTION

1. Field of the Invention

The present invention generally concerns methods and apparatus for the manufacture of thin-walled structures of thermoplastic material, and is more particularly directed at a centrifugal spray molding method and apparatus for easily, quickly and reliably making relatively thin-walled hollow containers of uniform wall thickness useful as liners for liquid storage tanks. Of particular interest to the present invention is the manufacture of inert liners for aircraft fuel tanks wherein it is important to maintain a uniform thickness of the liner wall to avoid blistering or deformation of the liner under internal pressure.

2. State of the Prior Art

Present methods for manufacturing thin-walled hollow structures of thermoplastic materials for the above stated purposes include rotational molding methods using a mold of cylindrical shape and closed at both ends. The mold is heated to a predetermined temperature and a load of powdered thermoplastic material is introduced into the mold while the mold is rotating simultaneously about its long axis and about a transverse axis. The powdered thermoplastic material is dispersed over the internal cylindrical walls of the rotating mold and melts thereon due to the elevated temperature of the mold surface. The thermoplastic material thus adheres to the mold surface and forms a sheet which takes on the shape of the internal mold surface. It has been found, however, that the wall thickness of fuel tank liners obtained by rotational molding methods cannot be kept within the desired tolerances. Little control can be maintained over the dispersion of the thermoplastic material because such dispersion is essentially random within the rotating mold, and the full quantity of thermoplastic material necessary for the manufacture of the desired liner is introduced at one time into the container for subsequent distribution over the mold surfaces by centrifugal forces provided by the prior art apparatus.

The applicant is also aware of the following patents relating to centrifugal casting and molding methods and devices which are basically centered around a revolving drum and apparatus for delivering a moldable material to the rotating interior surface of the drum.

U.S. Pat. No. 1,840,027 to Fetter, 1/5/32
U.S. Pat. No. 4,150,176 to Beckers, 4/17/79
U.S. Pat. Re. No. 25,587 to Wiltshire, 6/2/64
U.S. Pat. No. 3,666,528 to Barnhardt, 5/30/72
U.S. Pat. No. 3,150,219 to Schmidt, 9/22/64
U.S. Pat. No. 1,223,602 to Moir et al, 4/24/17
U.S. Pat. No. 1,142,829 to Maywald, 6/15/15

The Fetter patent discloses a method for making inner tubes of liquid rubber by spraying liquid rubber onto the inner cylindrical surface of a rotating tubular mold which is heated to a temperature sufficient to cause curing and hardening of the liquid rubber. The solidified material is then removed from the tubular mold. An axially movable nozzle is reciprocated between the two ends of the rotating cylindrical mold to coat the cylindrical surface with the liquid rubber material.

The remaining patents similarly deal with methods and apparatus for coating a rotating inner cylindrical surface with liquid material, either alone or in admixture with filamentary reinforcing material. Heat is applied either concurrently with the application of the liquid material or subsequently thereto to induce curing and solidification of the applied liquid.

SUMMARY OF THE INVENTION

The present invention improves over the prior art by providing a method and apparatus for maintaining a high degree of control over the thickness of the thermoplastic material deposited on the mold surface during the centrifugal molding of thin-walled plastic structures such as tubes and containers to obtain a more uniform wall thickness than has been previously obtained in such structures.

According to this invention, dry powdered thermoplastic material is deposited directly on a heated mold surface at such a carefully adjusted rate that substantially all of the deposited material melts on contact with the mold surface or with previously deposited molten material and adheres thereto in the area to which it is first applied. In order to obtain such results, the powdered thermoplastic material must be applied in relatively thin layers since local application of large quantities of material at one time will not result in its immediate melting. Thus, the construction of practical structures will normally require repeated depositions of powdered material over the mold surface in order to build up to a desired wall thickness. Local variations in the thickness of material deposited during each application tend to cancel out after a plurality of repeated applications with the result that the final overall thickness of thermoplastic material deposited on the mold surface will be substantially constant.

In a preferred manner of practicing the invention, the plastic material is sprayed onto an internal cavity mold surface while the mold is rotated relative to the spray nozzle such that centrifugal force is applied to the deposited thermoplastic material during the spraying while the material is in a heated, plastic state. The molten material flows readily under the influence of steadily applied centrifugal force and is evenly distributed to form a sheet of uniform thickness.

Briefly, the method of this invention is practiced by providing a mold surface and heating the mold surface to a temperature somewhat higher than the melting point of a given thermoplastic material. The mold surface is rotated at a predetermined speed so as to apply centrifugal force to material deposited on the heated mold surface. Thermoplastic material in powdered form is then deposited on the heated rotating mold surface at a rate such that the powdered material melts substantially on contact with the mold surface and adheres thereto in the area to which it is first applied so as to form a continuous sheet of thermoplastic material conforming in shape to the mold surface. Preferably, the powdered thermoplastic material is deposited by spraying the same in a gas stream at a carefully controlled rate such that the powdered material is deposited in an even, thin layer fully covering the heated mold surface. A number of such applications may be made over the mold surface to build up the thickness of the deposited material to a desired substantially constant thickness over the entire mold surface. The rotation of the mold surface may be accelerated following completion of the spraying of thermoplastic material so as to apply increased centrifugal force to the deposited material to thereby obtain increased density of the molded material. Preferably, the material is cooled slightly prior to such accelerated rotation to bring it to a jelled state.

The apparatus of the invention may include a tubular mold defining a cylindrical cavity having an open end and a closed end or which may be open at both ends, depending on the desired end product of the molding process. The cylindrical mold is mounted for rotation about a horizontal axis at a constant predetermined rate and is also heated to a predetermined substantially constant temperature which is somewhat higher than the melting point of a selected thermoplastic material to be deposited therein.

A spray unit includes a tube extending axially through an open end of the mold cavity and is supported so as to be horizontally slidable therein in an axial direction. The tube carries at its proximal end a spray nozzle positioned for spraying material in a radial direction onto the cylindrical walls of the cavity mold. Where the cylindrical mold is closed at one end, the nozzle may be rotatable from this radical attitude to a generally axial attitude co-aligned with said tube for spraying material onto the closed end of the cavity mold.

Deposition of thermoplastic material is commenced by supplying gas to the spray unit at a constant predetermined pressure. The nozzle is then moved axially from one end of the cylindrical cavity mold towards the other end thereof. The rate of axial movement is such as to fully cover the rotating mold with a thin even layer of thermoplastic material. As the nozzle approaches the closed end, if one exists, of the tubular cavity mold, the nozzle is rotated from the radial position to a generally axial position so as to spray thermoplastic material without interruption onto the closed end of the cylindrical cavity. When a thin layer of thermoplastic material fully covers the closed end of the cavity mold, the nozzle is rotated to the radial position and the axial tube is moved back towards the open end of the cavity mold at a rate such that a second thin even layer is applied over the previously deposited, molten material. Application of powdered thermoplastic material may be repeated in this manner a number of times until a desired thickness of thermoplastic material is deposited on the mold surface. It is understood that no rotation of the nozzle is necessary if both ends of the tubular mold are open. The end product in the latter case is a cylinder of thermoplastic material open at both ends.

In this manner, hollow thin-walled structures having substantially uniform wall thickness may be achieved in a reliable, rapid and inexpensive manner.

DETAILED DESCRIPTION OF THE INVENTION

Figure 1:
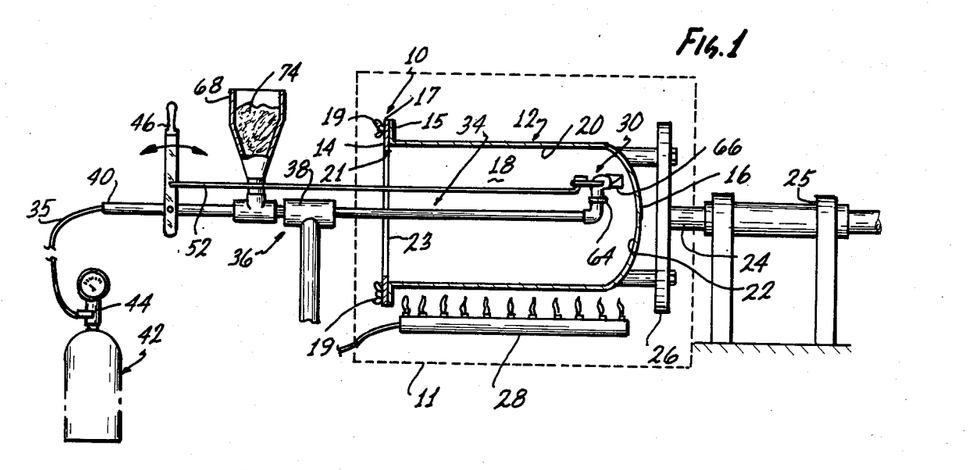
FIG. 1 is an elevation partly in section of one embodiment of the apparatus of this invention showing the axial spray nozzle and the rotatable cylindrical mold.

With reference to FIG. 1, the centrifugal spray molding apparatus 10 is shown in a simple embodiment to comprise a cylindrical mold 12 having an open end 14 and a closed end 16. The cylindrical mold defines a cavity 18 and an internal cylindrical mold surface 20 which includes a dished end wall 22 closing the cylindrical cavity at the closed end 16 of the mold 12. The cylindrical mold is mounted for rotation to a horizontal shaft 24 by means of support 26, the shaft 24 being journaled in bearings 25 and connected to be driven by appropriate means such as an electric motor and suitable clutch, gear train or pulleys (not shown in FIG. 1). Preferably, means are provided for adjusting the speed of rotation of the shaft 24, such as by controlling the power supplied to the motor, or by adjustment of the gear train, clutch or pulleys.

The external surface of the cylindrical mold 12 may be heated by means of a gas burner 28 or other heater means. Desirably, some means for regulating the temperature of the cylindrical mold 12 is supplied, such as a pyrometer mounted in contact with the rotating mold 12. Preferably, the rotating mold 12 may be enclosed in a temperature controlled oven as suggested by the enclosure 11 drawn in dotted lines in FIG. 1 where fine regulation of the mold temperature can be achieved. Such enclosure offers the advantage that both the exterior and interior of the cavity mold are heated at the same time and the thermoplastic material is heated as it is sprayed, so that it more readily melts and adheres to the mold surface 20 on contact therewith.

Figures 1A, 2:
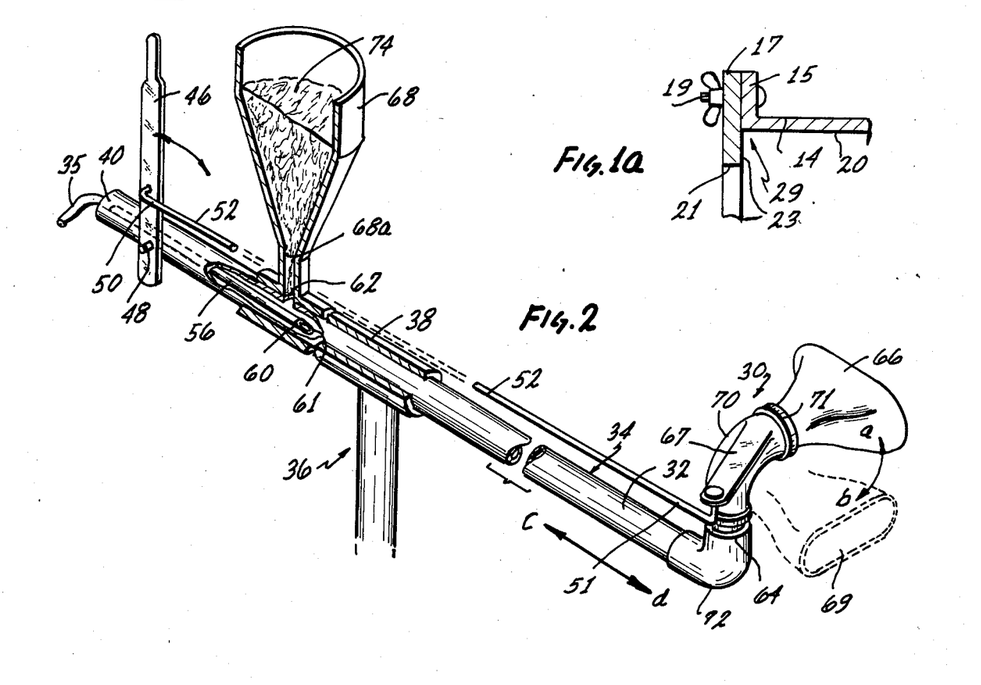
FIG. 1a is an enlarged cross sectional view showing the manner of attachment of the end plate to the open end of the cylinder mold.
FIG. 2 is a perspective view of the spray nozzle of FIG. 1 also showing, broken away, the venturi assembly for introducing powdered material into the gas stream.
Figure 3:
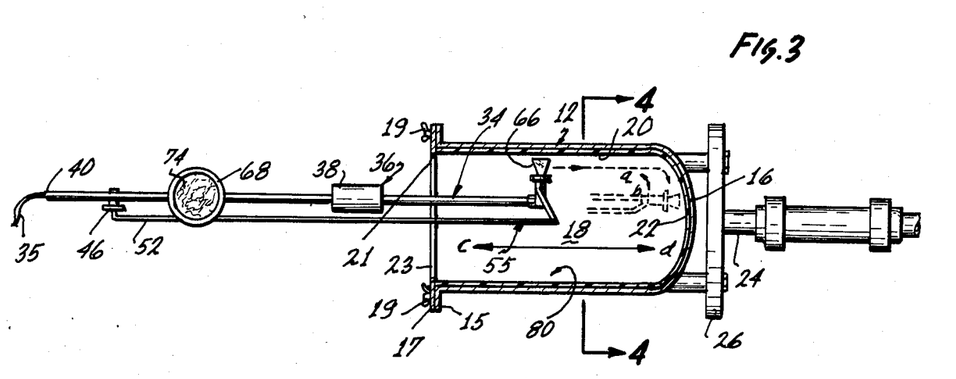
FIG. 3 is a plan view partly in section of the apparatus of FIG. 1 indicating the axial movement of the spray nozzle as well as its rotation from a radial attitude to an axial attitude near the closed end of the cylindrical mold.

A spray nozzle assembly 30 is mounted at the proximal end 32 of a tube 34 cantilevered to extend axially within the cylindrical cavity 18 by means of a T-support 36 which has a transverse horizontal pipe 38 through which the tube 34 may slide axially in the direction of arrows c-d, in FIGS. 2 and 3. The distal end 40 of the tube 34 receives a length of flexible tubing 35 connected to a source 42 of gas such as air under pressure. The source of gas 42 is preferably provided with means 44 for regulating the pressure of the compressed air supplied to the tube 34.

As shown in FIG. 2, the spray nozzle 66 may have relatively wide rectangular aperture 69 tapering to a cylindrical rear end 71 which is fitted into a first ninety degree elbow 70, which in turn is rotatable relative to a second ninety degree elbow 72. The second elbow 72 is affixed to the proximal end 32 of the tube 34 such that the nozzle may be rotated approximately 100° as indicated by the arrow a-b in FIG. 3, from a radial position a to an axial position b. The dimensions of the nozzle assembly are such that the mouth 69 of the nozzle 66 may be positioned approximately two and a half to three inches from the internal cylindrical surface 20 of the mold.

A lever 46 is pivotably secured to a distal portion of the tube 34 by means of pivot pin 48, and has connected thereto one end 50 of a linkage rod 52 extending generally parallel to the tube 34 and connected at its other end 51 to an arm 67 extending from the elbow 70 in such a manner as to be able to pivot the nozzle 66 between an attitude generally perpendicular to the tube 34 and an attitude colinear with said tube in response to manual movement of the lever 46, in the manner indicated by the arrows a-b in FIGS. 2 and 3.

It is understood, however, that other nozzle assemblies can be constructed to function effectively in the process of the present invention. The invention is therefore not restricted to the particular nozzle assembly described and illustrated.

As shown in the broken away portion of FIG. 2, the tube 34 includes a venturi tube 56 which extends coaxially within the tube 34 and is connected at the distal end of the tube 34 to the pressurized gas supply conduit 35. The inner end 60 of the venturi tube 56 is cut at a diagonal angle to present an upwardly facing elliptical orifice 61. A feeding orifice 62 is formed in the wall of the tube 34 slightly upstream (e.g. 1 inch) from the inner end 60 of the venturi tube. Powdered thermoplastic material 74 contained in a hopper 68 is fed through a downwardly extending passage 68a and the orifice 62 into the tube 34. The feed orifice 62 opens into a low pressure zone just upstream of the inner end 60 of the venturi tube 56 so that the powdered material is entrained in the gas stream and carried towards the proximal end 32 of the tube 34 to be expelled through the nozzle assembly 30.

The open end 14 of the cylindrical mold 12 in FIG. 1 is preferably provided with a radial flange 15 to which is removably attached a centrally apertured end plate 17 by means such as thumbscrews 19. The central aperture 21 defined by the end plate 17 permits passage of the nozzle assembly 30 but is of smaller diameter than the diameter of the cylindrical cavity, so as to form an inwardly extending radial flange 23 better seen in FIG. 1a. The inner flange 23 acts as a stop for molten thermoplastic material which is urged by centrifugal force into the corner 29 defined by the flange 23 with the cylindrical mold surface 20 to yield a clean, finished square edge on the molded part, eliminating the trimming which would be otherwise necessary.

A bladder element for making an inert fuel tank liner was manufactured of Hytrel #7246 thermoplastic material supplied by the Dupont Chemical Company and having a hardness grade of seventy-two (72). Previously, Hytrel material of this hardness had never been successfully molded by rotational molding methods although the use of this material is highly desirable for fuel tank liner applications. Present rotational molding methods are limited to Hytrel material having a hardness grade of sixty-three (63).

With reference to FIG. 1, a cylinder mold 12 was constructed of aluminum sheet having a thickness of one-sixteenth of an inch, the cylindrical cavity being nine inches in diameter by eighteen inches in length and closed at one end by a concave end wall 22. The end wall 22 has a radius of curvature such that it presents a dished, concave surface to the nozzle 66. This concavity is necessary to prevent the molten plastic material from being spun outwardly from the center of the circular end wall.

The required quantity of powdered Hytrel thermoplastic material was determined by weight by calculating the volume of material that would be required to make a liner halve of a given wall thickness in a mold of known dimensions. The volume of material of the finished liner together with the known density of the molded Hytrel material yielded the necessary weight of powdered material. This quantity of powdered Hytrel was placed in the hopper 68 on the tube 34. The temperature of the cylindrical mold 12 was elevated by means of a gas flame to a temperature of approximately 425° to 450° Fahrenheit, the melting point of the Hytrel material being approximately 425°.

The cylinder mold 12 was rotated at a constant speed of sixty (60) revolutions per minute and spraying of dry powdered Hytrel material onto the mold surface 20 was commenced by supplying pressurized air to the venturi tube 56. In the embodiment tested, the tube 34 was constructed of one-half inch internal diameter copper tubing and the venturi tube 56 of one-quarter inch internal diameter tubing. The venturi tube 56 was supplied with compressed air regulated to five pounds pressure. The quantity of material sprayed through the nozzle 66 may be adjusted by varying the pressure of the gas flowing from the venturi tube 56. Therefore, the air supply 42, whether a cylinder of compressed air or a compressor, desirably should be provided with means for holding constant the pressure at which the air is delivered as well as for adjusting the air pressure to obtain and hold steady an optimal rate of delivery of thermoplastic powder through the spray nozzle assembly 55.

The nozzle 66 may be reciprocated in an axial direction between the two ends of the rotating cylindrical cavity 18 in such a manner that powdered thermoplastic material 74 from the hopper 68 is deposited on the cylindrical interior cavity mold surface 20 in a generally helical path resulting from the combined rotation of the mold 12 and axial displacement of the nozzle 66. The powdered thermoplastic material is deposited on the mold surface 20 in a thin layer so that substantially all of the sprayed material melts and becomes tacky immediately on contact with the heated mold surface 20 and thus adheres to that portion of the mold surface which just received the thermoplastic material delivered by the spray nozzle 66, forming a continuous thin sheet. If the powdered material should be deposited at such an excessive rate that it does not melt on contact, the resulting layer of thermoplastic material will have a lumpy texture and produce an uneven wall thickness. For most practical structures, more than a single pass of the nozzle along the axis of the rotating cylinder will be necessary to build up the layer of thermoplastic material to a desired thickness.

The nozzle 66 should be moved axially at such a rate that the rotating cylindrical wall may be fully covered during each pass of the nozzle from one end of the cavity to the other. This rate of axial displacement of the nozzle is a function of the speed of rotation of the mold 12 and of the width of the spray delivered by the spray nozzle 66. The axial movement of the nozzle 66 should be such that each turn of the helical spray path slightly overlaps the preceding turn so as to continuously cover the mold surface. The spray nozzle of the tested embodiment of the invention, delivered a spray approximately two and a half to three inches wide on the cylinder wall 20.

As the spray nozzle 66 approaches the closed end 16 of the cylindrical cavity 18, the lever 46 is actuated to move the nozzle from its initially radial attitude through an angle which may be approximately 100 degrees to a generally axial position for depositing the powdered thermoplastic material onto the end wall 22 as the nozzle is rotated. The rotation of the nozzle, which may be slightly greater than ninety degrees, results in a small amount of overspray beyond the center point of the circular end wall 22, with the result that central area of the circular end wall may be slightly thicker than the radially outer areas thereof or than the cylindrical wall of deposited thermoplastic material. Spraying of the end wall 22 takes place during rotation of the nozzle from the radial to the axial position to obtain an even distribution of material over the rotating surface of the end wall. Desirably, the axial movement of the nozzle stops at a distance of two and a half to three inches from the inner surface of the end wall 22, which is approximately the same spacing of the nozzle 66 from the cylindrical wall 20 when the nozzle is in its radial position. After the nozzle has been returned to its radial position, it may again be moved axially towards the open end 14 of the cavity mold 12. This process should be repeated until the desired thickness of thermoplastic material has been deposited on the mold surface or until the metered supply of thermoplastic material in the hopper has been exhausted. The rate of deposition of thermoplastic powder at all times during the axial and rotational movement of the nozzle 66 is such that the sprayed material melts and adheres to the mold surface on contact and little if any powder is left to tumble in the rotating cylinder.

In the particular apparatus constructed and operated as has been just described, four to five passes of the nozzle 66 from one end to the other of the cylindrical cavity produced a cylindrical bladder of Hytrel closed at one end and having a wall thickness of forty-five thousandths of an inch. The thickness of the molded material was found to be uniform within plus or minus three one-thousandths of an inch.

By building up the deposited thermoplastic material to a desired final thickness over several passes of the spray nozzle, because of the continued heating and rotation of the mold, any local variations in the thickness of deposited material will tend to cancel out to yield a substantially uniform wall thickness for the finished liner of thermoplastic material.

If desired, the mold may be rotated at a higher speed once spraying has been completed to increase the density of the sheet of thermoplastic material. Preferably, the deposited material is cooled slightly after completion of spraying to bring the thermoplastic material to a jelly like consistency and the rotation of the mold is then accelerated to apply increased centrifugal force to the deposited material. The greater the speed of rotation of the mold, the greater the resulting density of the molded material.

Figure 4:
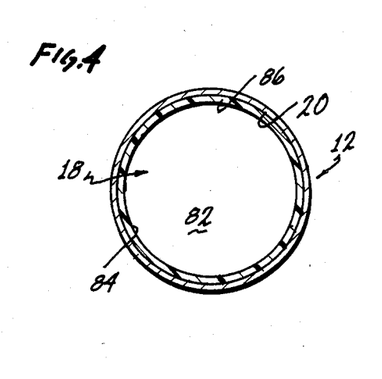
FIG. 4 is a section of the cylindrical mold of FIG. 3 taken on the line 4—4 showing a sheet of thermoplastic material deposited on the interior cylindrical surface.
Figure 5:
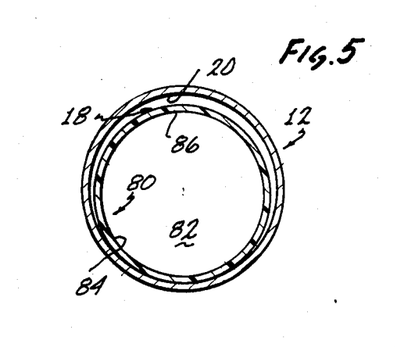
FIG. 5 is a section similar to that of FIG. 4 but showing the molded liner of thermoplastic material in a contracted condition separated from the cylindrical mold following its cooling.
Figure 6:
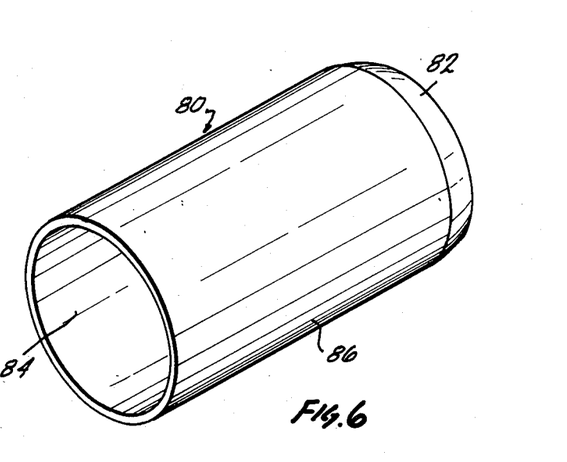
FIG. 6 is a perspective view of a finished liner after its removal from the mold.

A finished part molded by the method of the present invention in the above-described apparatus is shown in FIGS. 4, 5 and 6. FIG. 4 shows in axial cross section the cylindrical wall 86 of molded thermoplastic material which conforms to the cylindrical mold surface 20 defined by the cavity mold 12.

The molded article 80 seen in FIG. 3 may be removed by first removing the annular plate 17 held by thumbscrews 19 and backing out the T-support 36 and tube 34 with the nozzle assembly from the cylindrical mold cavity 18.

The removal of the molded article is facilitated by cooling the mold surface 20 to contract the thermoplastic material. As such contraction occurs, the molded cylinder 86 pulls away from the mold surface 20, as illustrated in FIG. 5. FIG. 6 shows in perspective view the article 80 following removal from the mold 12. The article is a cylinder having a closed end 82 and an open end 84. Two such parts or halves can be joined at their open ends 84 by means of an adhesive sleeve insert or other means connecting the two open ends to thereby construct a closed cylindrical container or bladder suitable among other purposes for use in lining liquid storage tanks and particularly fuel storage tanks for which the inert Hytrel material is particularly suited. If desired, one or more intermediate cylindrical liner segments open at both ends may be connected between two liner portions each having a closed end to thereby construct a longer container or liner.

It is desirable to construct the mold 12 of relatively thin heat conductive material to allow rapid cooling of the mold as well as rapid reheating of the mold for the next molding operation. This rapid cooling and reheating is highly desirable for the efficient production of such molded liner halves. Presently practiced rotational molding techniques make use of cast aluminum molds having a wall thickness in the order of one-half inch, which creates a large thermal mass and slows down both cooling and heating. It is also difficult to evenly heat such a large metallic mass rotating simultaneously about two perpendicular axes so that burning of the thermoplastic material frequently occur.

In addition, slow cooling of Hytrel material causes embrittlement of the molded plastic resulting in inferior articles. The use of thin-walled molds which can be rapidly cooled avoids such difficulties and yields articles of more pliable material. For example, the cylinder mold 12 may be passed under a spray of cold water as soon as the molding operation has been completed to thus rapidly cool the molded article and minimize embrittlement of the material.

It should be emphasized that an important aspect of the present invention is that the thermoplastic material is molded in an open mold such that moisture, which is easily absorbed by the powdered thermoplastic material, can be exhausted from the mold without difficulty. By venting moisture as well as air trapped in the thermoplastic material through the open end of the mold, the quality and uniformity of the deposited layer of thermoplastic material is enhanced. This is not readily possible in rotational molding where the cavity mold is of necessity closed to contain the powdered thermoplastic material while the mold is rotated about two perpendicular axes. It has been found that in present rotational molding methods, trapped moisture in the thermoplastic material causes local weak zones which form blisters when the interior of molded liners is pressurized. While it is not essential that the mold 12 be placed within an enclosure during the molding process, it is preferred that an enclosure be provided as suggested by the box 11 in dotted lines in FIG. 1. An enclosure such as the oven illustrated in FIGS. 7 and 8 more evenly heats both the exterior and interior of the mold 12 as well as heating the powdered thermoplastic material as it is being sprayed. The preheated powder more readily melts on contact with the mold or with previously deposited, molten material thus promoting more uniform deposition and build up of the thermoplastic substance.

Figure 9:
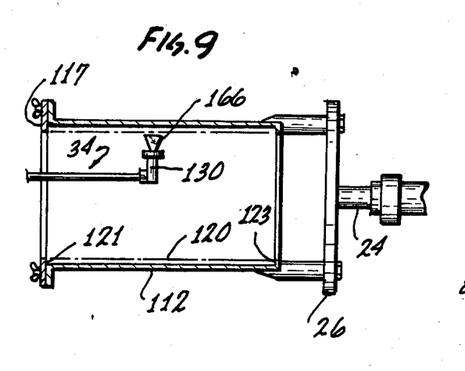
FIG. 9 illustrates in axial section apparatus for spray molding cylinders open at both ends.

The spray molding method disclosed herein may be employed for making cylindrical structures open at both ends. For this purpose the simplified apparatus of FIG. 9 may be used wherein the rotatable mold 112 defines a straight cylindrical internal mold surface 120 open at both ends. Preferably, internal flanges 121 and 123 are provided for squaring the ends of the molded cylinders, one of the flanges, e.g. 121, being defined by a removable end plate 117. The nozzle assembly 130 may be simplified to a rigid right angle mount for the nozzle 166, since no rotation of the nozzle is required for spraying an end wall. The nozzle 66 may be reciprocated between the two open ends of the mold 112 while powdered thermoplastic material is sprayed onto the heated rotating mold surface 120, in the manner described with reference to FIGS. 1-6 to obtain molded tubular structures open at both ends.

The present invention also contemplates spraying powdered thermoplastic material onto an external surface of a heated, rotating mold rather than the internal surface of a cavity mold. The sprayed material adheres in a molten state to the external surface and is subject to centrifugal force, which however is kept lesser than the force of adhesion of the plastic material to the external mold surface to avoid flinging away of the plastic from the mold. The method of the invention is not limited to cylindrical cavity mold surfaces but may be extended to cavities having elliptical, polygonal or other cross sections.

While a particular embodiment of the apparatus of this invention has been described and particular dimensions given for the various parts thereof, it will be appreciated that the various dimensions may be altered with appropriate changes in the operating parameters such as the speed of rotation of the mold and pressure of the gas stream through the spray unit. The rate of deposition of powdered thermoplastic material onto the rotating mold surface is chiefly determined by the speed of rotation of the mold surface relative to the stationary spray nozzle and also by the pressure of the gas supplied to the spray unit. In general, the rate of deposition of powdered material is proportional to the pressure of the air supply and inversely proportional to the speed of rotation of the drum. It will be readily appreciated that the rate of deposition of material is also affected by the rate of linear axial displacement of the nozzle within the mold cavity. Different kinds of thermoplastic materials can be used in the practice of this invention other than the Hytrel material, with different melting points which would require corresponding adjustment of the temperature of the mold surface.

It is believed that a substantially constant or uniform thickness of molded material is obtainable through the invented method due to a number of factors which cooperate towards that result. These are believed to include the local application of moldable material to the mold surface at a carefully controlled rate, the steady, continuous application of centrifugal force about a single horizontal axis of rotation to the molten applied material, and the application of moldable material in multiple thin layers. The quality of the molded articles is further enhanced by the use of an open mold which allows circulation of hot air within the mold cavity for removing moisture from the cavity and for preheating the thermoplastic powder.

Figure 7:
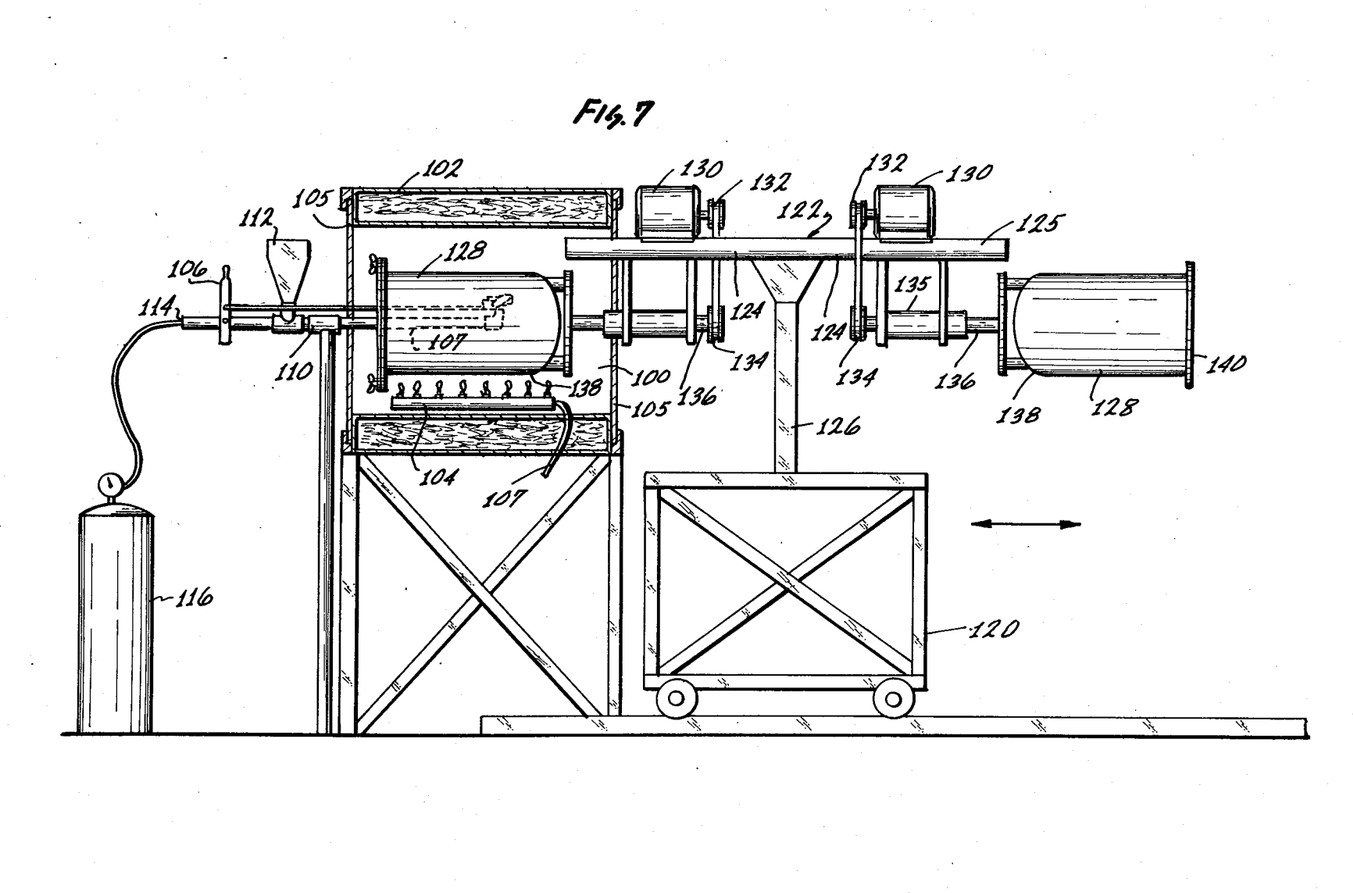
FIG. 7 is an elevation partly in section of a further embodiment of the invention for the efficient mass production of liners of thermoplastic material in accordance with the method of the present invention.
Figure 8:
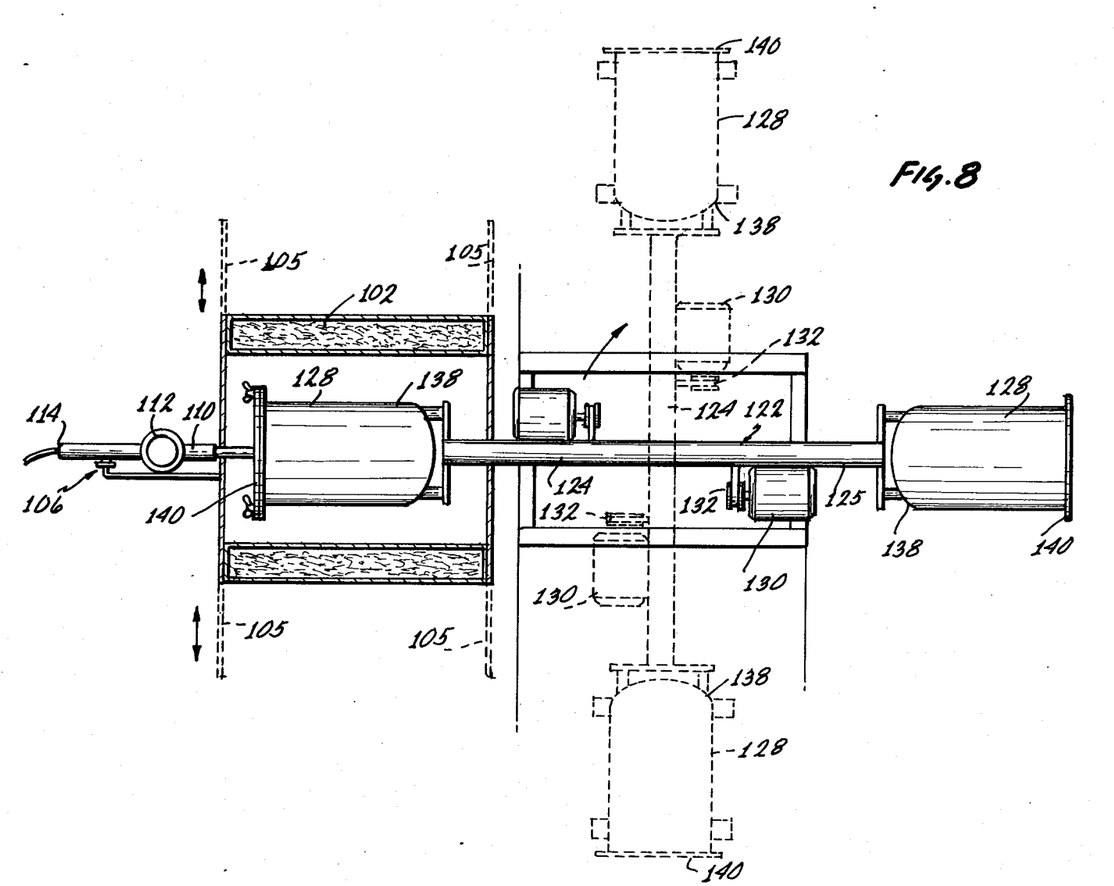
FIG. 8 is a plan view in partial cross section of the apparatus of FIG. 7.

Turning now to FIGS. 7 and 8 of the drawings, an apparatus is shown for the more efficient mass production of centrifugally molded liner halves by the invented method. The apparatus comprises an oven cavity 100 including insulation 102 and a heater such as a gas burner 104 connected by conduit 107 to a supply of fuel (not shown). The temperature control means of conventional commercially available type (not shown) may be provided for regulating the temperature of the oven. A spray unit 106 of construction similar to that shown in FIG. 2 and previously described is mounted by means of T-support 108 so as to be reciprocally slidable within the horizontal tube 110 of the T-support. As previously described, the spray unit 106 is provided with a hopper 112 or equivalent device for feeding powdered thermoplastic material into the spray unit. The rear end 114 of the spray tube 107 is connected to a regulated supply of compressed gas 116. A rolling carriage 120 is mounted for reciprocal movement towards and away the oven cavity 100 and supports a turnstile 122 which may comprise two or more arms 124 rotatable about the vertical axis 126. Each radial arm 124 carries at its radially outer extremity a mold 128 mounted for rotation along an axis parallel to the radial arm. A power drive train is mounted to the radially inner portion of each arm 124 and may comprise an electric motor 130 connected through drive pulleys 132 and 134 to a drive shaft 136 connected for rotating the mold 128. Both the drive shaft 136 and mold 128 are journaled in suitable bearings 135 mounted to the radial arm 124 to permit free rotation of the mold. The mold 128 has a radially inner closed end 138 and an open end 140 at the radially outer end 125 of the radial arm. The turnstile 122 is constructed such that the carriage 120 may be moved towards the oven cavity 100 and the mold 128 may receive coaxially the tube 107 of the spray unit through its open end 140. When a mold cavity defined by a mold 128 has been brought into proper alignment with the spray unit, the mold is brought to the required temperature in the oven cavity 100 and rotation of the mold at the predetermined speed is commenced by activating the motor 130. Thermoplastic material may then be applied onto the interior mold surface in the manner previously described in connection with FIGS. 1-6. When the required quantity of material has been deposited within the mold 128, the oven doors 105 are slid open and the carriage 120 is moved away from the oven to extract the mold 128 from the oven cavity 100. The turnstile 122 is then rotated to bring a second mold 128 on another radial arm 124 into proper alignment with the spray unit 106 and the carriage 120 is again moved towards the oven so that the spray unit is inserted into the mold cavity. The molding process is then again repeated. In the meantime, the mold previously extracted may be cooled by a steam of air or water or other convenient means and a molded part removed therefrom. In this manner, parts may be manufactured by the process of this invention in an efficient manner.

Other embodiments of the apparatus of this invention may be constructed without altering the process of this invention. For example, with reference to FIG. 8, the turnstile 122 may include two or four radial arms 124 as suggested in dotted lines.

Various changes and modifications of the aforedescribed method and apparatus will be apparent to those skilled in the art without departing from the spirit and scope of the present invention. Applicant therefore intends to be bound only by the scope of the following claims:

I claim:

1. A method for molding thin-walled containers comprising the steps of:

providing a cavity mold having an open end and a closed end and defining an internal mold surface including an internal end surface;

rotating said mold about an axis extending between said ends, said axis being disposed horizontally;

heating said internal surfaces to a temperature greater than the melting temperature of a selected thermoplastic material;

introducing a nozzle into said cavity for spraying powdered thermoplastic material onto an area substantially smaller in the axial direction than the axial dimension of said mold cavity, said nozzle being movable between said ends, said nozzle being also rotatable between a radial position for spraying thermoplastic material onto said mold surface and an axial position for spraying thermoplastic material onto said end surface;

spraying the selected thermoplastic material onto said heated rotating mold surface at a rate such that substantially all of the sprayed powdered thermoplastic material melts substantially on contact with said internal surfaces;

moving said nozzle in an axial direction from said open end toward said closed end to fully cover said rotating mold surface with thermoplastic material;

rotating said nozzle near said closed end from said radial position to said axial position to cover said end surface with thermoplastic material;

rotating the nozzle from said axial position to said radial position;

moving said nozzle toward said open end;

repeating the movement of said nozzle between said ends including rotation thereof near the closed end to thereby form a mold liner of a desired substantially uniform thickness of thermoplastic material covering said internal surfaces;

removing said mold liner of thermoplastic material from said mold cavity; and assembling a pair of such mold liners, each having a closed end, at their open ends to thereby make a tubular container closed at both ends.

2. The method of claim 1 wherein said step of removing further comprises the step of cooling said tubular mold to cause said molded thermoplastic material to contract away from said internal mold surface thereby to facilitate removal thereof.

3. The method of claim 2 further comprising the step of slightly cooling said mold following completion of spraying of thermoplastic material to jell said sprayed material on said mold surface; and increasing the speed of rotation of said tubular mold to apply greater centrifugal force to said sprayed thermoplastic material thereby to increase the density of the thermoplastic material.

4. A method for making thin-walled articles suitable for use as liners in fluid storage tanks comprising the steps of:

providing a cavity mold having an open end and a closed end and defining an internal generally axial surface and an internal end surface transverse to said axial surface;

rotating said mold about a horizontal axis extending between said ends;

heating said internal surfaces to a temperature greater than the melting temperature of a selected thermoplastic material;

introducing a single directional spray nozzle into said cavity for spraying powdered thermoplastic material onto an area substantially smaller in both axial and radial dimension than said axial surface, nozzle carrier means for reciprocably moving said nozzle between said ends, said nozzle being also rotatable relative to said nozzle carrier means between a radial position for spraying thermoplastic material onto said axial surface and an axial position for spraying thermoplastic material onto said end surface;

spraying the selected thermoplastic material onto said heated rotating mold surface at a rate such that substantially all of the sprayed powdered thermoplastic material melts and adheres to the mold substantially on contact with said internal surfaces;

moving in said nozzle carrier means with said nozzle oriented in said radial direction from said open end toward said closed end to fully cover said rotating axial surface with an even layer of molten thermoplastic material;

rotating said nozzle relative to said nozzle carrier means near said closed end without interrupting said spraying from said radial position to said axial position to cover said end surface with thermoplastic material in a layer continuous with that on the axial surface;

returning the nozzle from said axial position to said radial position without interrupting said spraying moving out said nozzle carrier means from said closed end toward said open end; and repeating the steps of moving in, rotating said nozzle returing and moving out a sufficient number of times to apply a desired thickness of thermoplastic material of substantially uniform thickness covering both said axial and end surfaces.

* * * * *